(12) United States Patent
Hendricks et al.

(10) Patent No.: US 6,296,821 B1
(45) Date of Patent: Oct. 2, 2001

(54) COMPLEX SHAPED FIBER FOR PARTICLE AND MOLECULAR FILTRATION

(75) Inventors: Neil H. Hendricks, Sonora; Jeff Miller, Los Gatos, both of CA (US); Ron Paul Rohrbach, Flemington, NJ (US); Dan E. Bause, Flanders, NJ (US); Peter Dale Unger, Morristownship, NJ (US); Adel George Tannous; Randy R. LeClaire, both of Santa Clara, CA (US); William E. McGeever, Morgan Hill, CA (US)

(73) Assignee: Allied Signal Inc., Morristown, NJ (US)

(*) Notice: Subject to any disclaimer, the term of this patent is extended or adjusted under 35 U.S.C. 154(b) by 0 days.

(21) Appl. No.: 09/422,039

(22) Filed: Oct. 12, 1999

(51) Int. Cl.[7] ............... C01C 1/10; C01C 1/12; B01D 39/00; B01D 39/04
(52) U.S. Cl. ............ 423/237; 423/239.1; 210/502.1; 210/505; 210/508; 210/509; 210/670; 210/903
(58) Field of Search .............. 210/502.1, 505, 210/508, 509, 670, 903; 423/235, 237, 239.1

(56) References Cited

U.S. PATENT DOCUMENTS

| | | |
|---|---|---|
| 5,057,368 | 10/1991 | Largman et al. ............ 428/397 |
| 5,704,966 | 1/1998 | Rohrbach et al. ............ 95/170 |
| 5,713,971 | 2/1998 | Rohrbach et al. ............ 55/233 |
| 5,759,394 | 6/1998 | Rohrbach et al. ............ 210/264 |
| 5,891,221 | 4/1999 | Rohrbach et al. ............ 95/159 |
| 5,902,384 | 5/1999 | Rohrbach et al. ............ 96/296 |
| 5,951,744 * | 9/1999 | Rohrbach et al. ............ 96/154 |

* cited by examiner

*Primary Examiner*—Steven P. Griffin
*Assistant Examiner*—Maribel Medina
(74) *Attorney, Agent, or Firm*—Fish & Associates, LLP; Robert D. Fish

(57) ABSTRACT

An ultra-efficient multilobal cross-sectioned fiber filter for chemical contaminant filtering applications is described. An absorptive chemically reactive reagent, preferably an acid or base and in liquid or an adsorptive chemically reactive reagent (an acid or base) in solid form, is disposed within longitudinal slots in each length of fiber. The reagent may be used alone or in conjunction with solid adsorptive particles which may also be utilized with the reagents in the longitudinal slots within the fibers. Reagents within the fibers remain exposed to a base-contaminated airstream passing through the filter. Base contaminants in the airstream, chemicals such as ammonium and amines (as well as particles), react with the acid reagent within the longitudinal slots of the fibers. As the contaminant and reagent react, the ammonium or amine becomes irreversibly absorbed (or adsorbed if reagent is a solid acid) to the liquid acid reagent and multilobal fiber.

48 Claims, 2 Drawing Sheets

# COMPLEX SHAPED FIBER FOR PARTICLE AND MOLECULAR FILTRATION

BACKGROUND

1. Field of the Invention

This invention relates to a filter system and specifically to a system utilizing solid and liquid reagents.

2. Description of Related Art

It is conventionally known to use activated charcoal and other materials as adsorptive elements to remove impurities from an airstream. With the advent of effective fiber cross sections, it is possible to produce fibers which are partially hollow. A particularly effective cross section is one having three T-shaped lobes extending from a central core, as described in U.S. Pat. No. 5,057,368, which is incorporated herein by reference. Conventional filters have used filtering media coated with solid or liquid materials in a variety of applications; however, many of these applications have relied on absorption, rather than adsorption. Adsorption occurs where particles to be removed attach to the surface of the fitter material elements; whereas, absorption occurs where molecular motion mobility is harnessed to move unwanted particles from one zone to another in a non-mechanical manner. The multilobal fiber has been particularly effective as a wicking fiber where certain contaminant-removing liquids or solids are filled in cavities formed within the fiber.

The multilobal fiber filled with solid filtering particles have been used in adsorptive air filtration and odor-removing applications. Such filtering particles have included the use of carbon particles, zeolites, baking soda, cyclodextrins, and solids which could adsorb certain contaminants (see U.S. Pat. No. 5,759,394, which is incorporated herein by reference). Other applications utilizing multilobal-type fibers as wicking fibers also have involved absorptive properties of certain liquids which are filled within the cavities of the fibers. These liquids were typically chosen to lightly absorb odor and gas molecules in a reversible manner from a contaminated airstream to aid in the eventual dispersion of these molecules into a second airstream (see U.S. Pat. Nos. 5,891,221 and 5,704,966, which are incorporated herein by reference).

Maintaining environments free of contaminants is particularly critical in the manufacturing of integrated circuits because wafers are very susceptible to small particles and low levels of certain chemicals. This can be done by manufacturing wafers inside cleanrooms with filtered air. The filters are used to reduce particle and chemical levels to extremely low levels (less than 1 part-per-billion). Semiconductor tools are also sometimes equipped with environmental controls that provide local ultra clean airflow during processing. However, conventional chemical filters have a very short life span, require frequent replacement, and are ineffective at efficiently filtering out certain chemicals.

SUMMARY

In accordance with the invention, an ultra-high efficient multilobal fiber filter is described with long life use for chemical contaminant filtering applications. The unexpected ultra efficiency of the fiber filter reduces contaminants to low levels in the parts-per-billion. A reactive reagent, preferably an acid or base and in either liquid or solid form, is disposed within longitudinal slots in each length of fiber. The reagent may be reactive with base contaminants by any known mechanism, such as an acid-base reaction to form ionic bonds, an oxidation-reduction reaction, and various other organic and inorganic reaction mechanisms as known in the art to form covalent bonds, hydrogen bonds, coordination compounds, or complex compounds. The reagent may be used alone or in conjunction with solid adsorptive particles which may also be utilized with the reagents in the longitudinal slots within the fibers. The fibers are formed into a single layered, in one embodiment, or a multi-layered fiber mat, in another embodiment, but the reagents remain exposed to the flow of a contaminated airstream passing through the filter. The contaminants in a fluid stream react within the longitudinal slots of the fibers. As the base contaminant and reagent react, the contaminant is retained within the longitudinal slots of the fiber.

In a preferred embodiment, the contaminants are ammonium and/or amines and the reagent is an acid. The acid-impregnated multilobal fiber is significantly more efficient than several commercially available filters. The filter can be used in a variety of applications including clean rooms and in filtering chambers for installation in the field.

BRIEF DESCRIPTION OF THE DRAWINGS

Use of the same reference symbols in different figures indicates similar or identical items.

DETAILED DESCRIPTION

Figure 1:
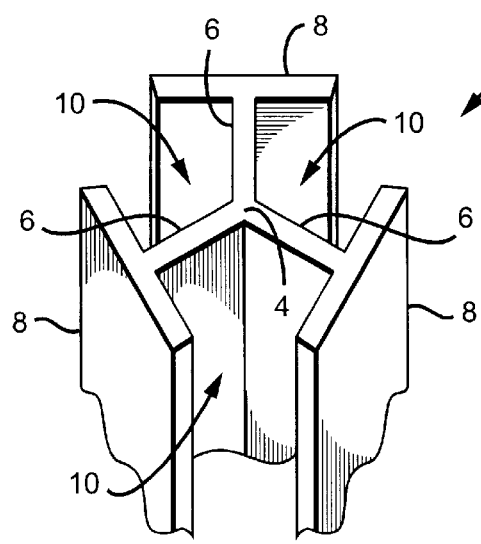
FIG. 1 shows a detailed cross-sectional view of an individual multilobal fiber.

FIG. 1 shows a detailed view of a cross section of an individual multilobal fiber 2. Fiber 2 is a type of fiber made of thermoplastic polymers and formed by conventional fiber forming techniques, such as spinning a fiber composition through a conventional spinnerate, as described in the above-referenced U.S. Pat. No. 5,057,368. Fiber 2 includes a core 4, from which three lobes 6 extend outwardly. Each of lobes 6 terminates with a cap 8 which is perpendicularly attached to the end of lobe 6. The cavity formed between lobe 6 and adjacent caps 8 runs along the entire length of multilobal fiber 2 forming longitudinal slot 10. Multilobal fiber 2 has the ability to retain powdered particulate matter, such as powdered carbon. The carbon powder can be mechanically held within slot 10 entrapped by caps 8 without the use of any liquids. Entrapping the powder within slot 10 can be accomplished by dusting the powder into the fibers and then shaking off the excess powder or blowing the excess powder off with a fan.

Figure 2:
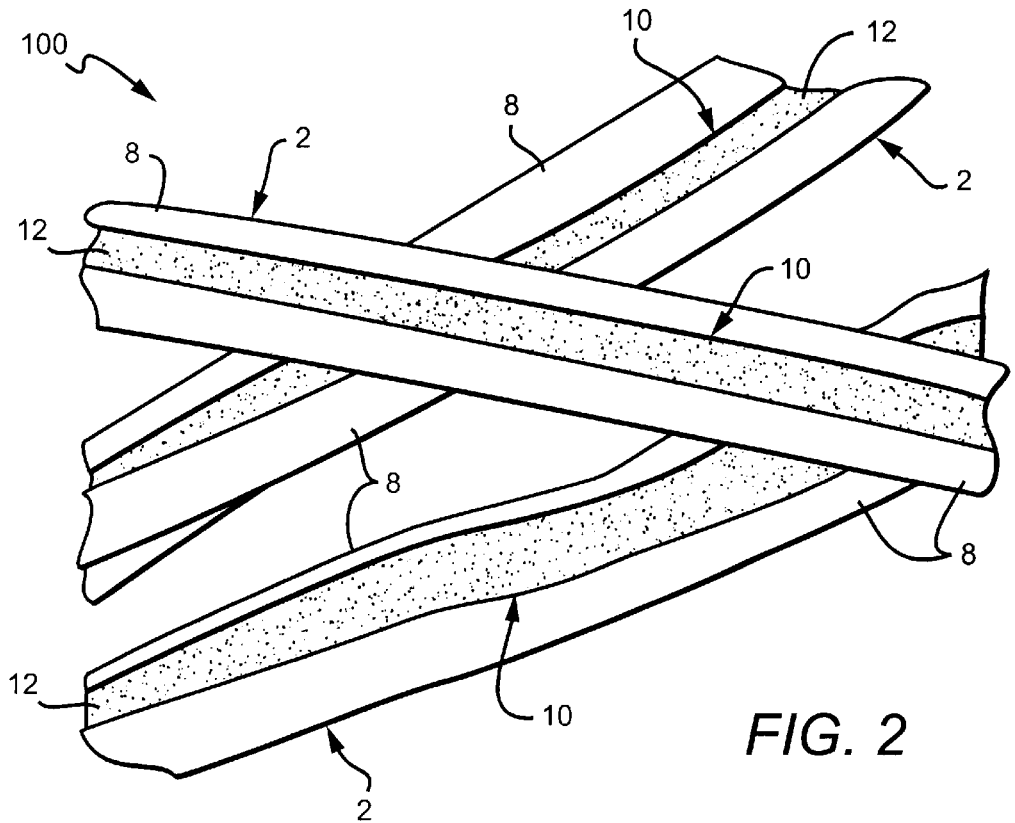
FIG. 2 shows a close-up view of a fiber mat made of multilobal fibers with a reagent disposed within each multilobal fiber.

Preferably, fiber 2 can hold, through capillary forces, liquids within slot 10. FIG. 2 shows a close-up view of fiber mat 100 where liquid reagent 12 is filled within slots 10 of meshed fibers 2. Liquid reagent 12 can be utilized to fill slots 10 by having liquid droplets penetrate fiber mat 100 and wicking into slots 10 after impacting with the surfaces of fibers 2. After the liquid droplets impact with fibers 2, they quickly coalesce into slots 10 while leaving open voids between fibers 2 and allowing for unencumbered airflow through fiber mat 100. Fibers 2 can alternatively wick reagent 12 up within slots 10 by capillary force by dipping fibers 2 into reagent 12 and removing excess reagent 12.

Reagent 12 can be formed into liquid droplets by different methods such as forcing reagent 12 through a mechanical atomizer or preferably by using a conventional liquid dropper. Reagent 12 can range from a variety of liquids such as acids, oxidants, reductants, complexing agents, coordinating agents, and deliquescent agents; however, it is preferable to use acids. Acids for use as reagent 12 include, but are not limited to, inorganic acids such as boric acid and preferably phosphoric or sulfuric acid. Organic acids may also be used rather than inorganic acids. Organic acids include, but are not limited to, monocarboxylic, dicarboxylic, and tricarboxylic acids; these types of organic acids include citric, lactic, maleic, fumaric, caproic, lauric, oxalic, malonic, tartaric, succinic, salicyclic, and malic acids. In another embodiment, powdered acids may also be used in place of the liquid acid and impregnated within slots 10 in a method similar to that described above for carbon powder. In an alternative embodiment, powdered bases may also be used to filter non-basic contaminants. Such powdered bases may include, e.g., sodium bicarbonate (baking soda), sodium carbonate, sodium hydroxide, trisodium phosphate, potassium carbonate, potassium hydroxide, and sodium tetraborate. Also, reagent 12 may include coordinating agents which comprise transition metals, e.g., copper, and complexing agents which comprise entrapping agents, e.g., cyclodextrines.

Figures 3, 4, 6:
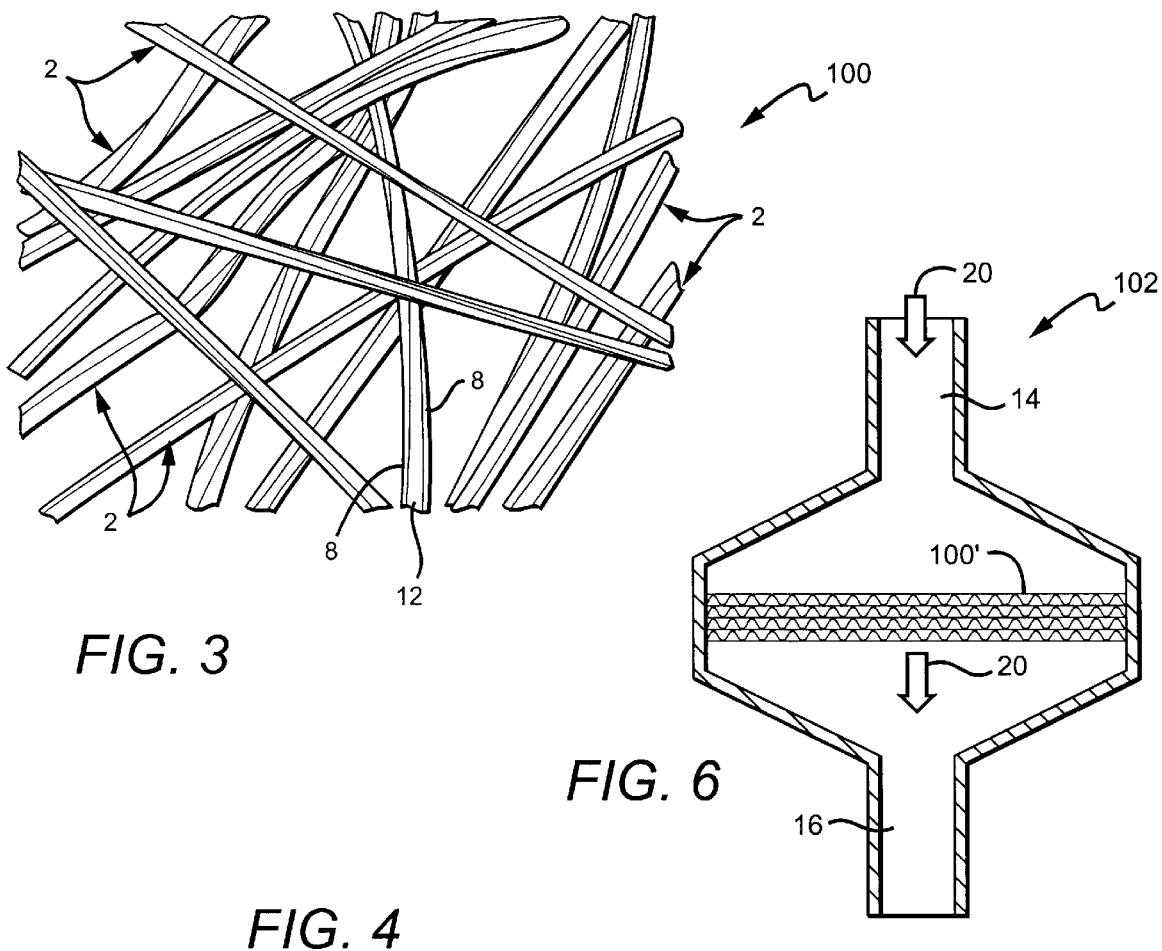
FIG. 3 shows a wider view of the fiber mat of FIG. 2.
FIG. 4 shows a plot comparing the percentage of contaminant breakthrough over time for the acid-impregnated multilobal fiber versus two other commercially available filters.
FIG. 6 shows the chamber of FIG. 5 with a multi-layered multilobal fiber filter.

FIG. 3 shows a wider view of fiber mat 100. Fibers 2 can be pleated or formed in layers to form fiber mat 100 in a variety of configurations. Generally, the volume within slot 10 makes up about half the volume of multilobal fiber 2 and depending upon the density of the contaminant, fibers 2 can gain around 100% in weight of liquid contaminants and anywhere from 25% to 125% in weight for solid powders within slots 10. Utilizing the multilobal fiber 2 property to capture both liquid or solid contaminants, reagent 12 is used for adsorptive and absorptive filtration applications. Reagents 12 are intentionally impregnated within slots 10 and can be a reactive liquid or a solid reagent, preferably both acid, and fiber mat 100 is used as a supportive network to hold reagents 12 in a highly dispersed configuration for adsorptive and absorptive molecular contaminant removal. Multilobal fiber 2 can retain not only a liquid or solid (acid) reagent 12, but is effective in also retaining a combination of a liquid reagent and solid particulates. Solid adsorbants such as zeolites, aluminum oxides, activated carbons (both impregnated and virgin), and chemically modified silicas can be combined with acid reagent 12, in either liquid or solid form, and impregnated within slots 10 of multilobal fibers 2. Solid adsorbants may also be used in combination with base reagent 12 and impregnated within slots 10.

Fiber mat 100 is particularly effective in filtering base contaminants from a passing fluid stream. Bases are considered any chemicals or compounds conventionally regarded as a base in the chemical arts. These chemicals and compounds include Lewis bases, shift bases, aqueous bases, and preferably any compounds that are alkaline in an aqueous environment. Ammonium and amines are preferable bases.

A fiber mat 100 impregnated with liquid acid reagents 12 is particularly effective in specifically absorbing base contaminants, such as ammonium, $NH_3$, and amines (for example, n-methyl-2-pyrrolidone (NMP)) from a passing fluid stream. An airstream with contaminants, for example, ammonium ions, passes through fiber mat 100. As it passes over multilobal fibers 2 impregnated with acid reagent 12, the ammonium ion chemically reacts (in a reaction well known in the art) with and is adsorbed by acid reagent 12 to form a salt. Acid reagent 12 exchanges hydrogen atoms with the ammonium ions, forming water as a byproduct and leaving the ammonium ion to react with and attach to acid reagent 12. Reagent 12 irreversibly retains the ammonium ions within the slots 10 of multilobal fiber 2.

The combination of multilobal fibers 2 impregnated with a liquid acid reagent 12 gives unexpected, ultra-high efficient results in filtering out base contaminants. The effectiveness of fiber mat 100 utilizing multilobal fibers 2 impregnated with acid reagent 12 can be seen in FIG. 4 when compared to two conventionally available acid-impregnated commercial filters. All three filters were subjected to a continuous 90 parts-per-million (ppm) exposure of a gas contaminated with ammonium diluted in air. The air was conditioned to 50% relative humidity and 23° C.; the air was blown through the filters at a velocity of 150 ft/min giving an equivalent pressure drop for all three filters. The basic gas concentration was measured continuously downstream of each filter and the breakthrough percentage of the contaminants were plotted over time. The breakthrough percentage is the amount of contaminants remaining in the air downstream of the filter relative to the amount of contaminants initially in the air upstream of the filter.

As seen in FIG. 4, curve A represents multilobal fiber 2 impregnated with acid reagent 12. Curves B and C represent the results of other commercially available filters. The results of curve A show significant retention of contaminants from the acid-impregnated multilobal filter 2 over either curve B or C showing the effectiveness and longer life of the acid-reagent 12 used in conjunction with multilobal fiber 2. The retention time of fiber mat 100 is nearly three times as long as the retention time shown in curve B (120 minutes at about 0% breakthrough versus 40 minutes at about 4% breakthrough for curve B).

Figure 5:
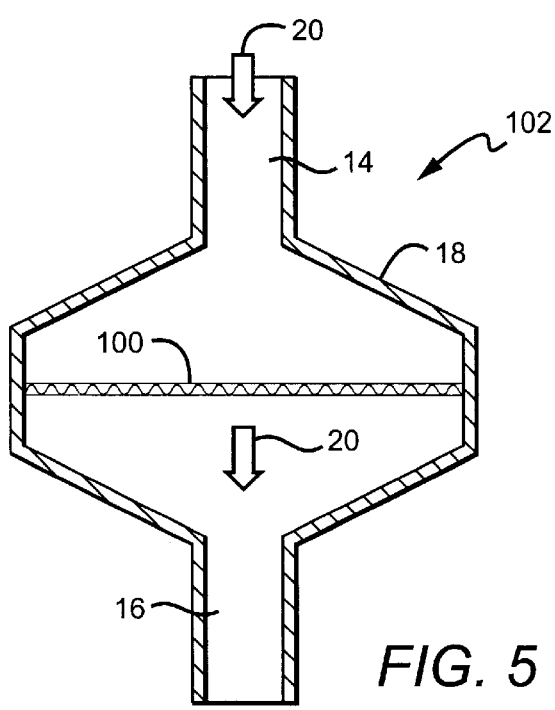
FIG. 5 shows a chamber in one embodiment for use in filtering an airstream with the acid-impregnated multilobal fiber filter.

Fiber mat 100 utilizing acid reagent 12 in multilobal fiber 2 can be used in a variety of applications, e.g., pleating or layering multilobal fiber 2 to form fiber mat 100. Fiber mat 100 can be used, in one embodiment, as a filtering element in a filtering chamber 102 as shown in FIG. 5. Chamber 102 consists of a housing 18, which can be designed from a conventional metal, e.g., aluminum, to accommodate handling and field installation. The pleated or layered fiber mat 100 is attached to housing 18, preferably by an adhesive or a low outgassing glue. It is also possible, in an alternative embodiment, to have fiber mat 100 attached to a frame (frame is not shown); this frame with fiber mat 100 can then be installed or removed interchangeably within housing 18. Housing 18 also has an inlet 14 and an outlet 16 to allow an airstream 20 to pass through filtering chamber 102 while being filtered through fiber mat 100. Chamber 102 can be used to provide particle and chemical filtration for ammoniums, amines, and particles for chemical clean room environments.

FIG. 6 shows an alternative embodiment of fiber mat 100. FIG. 6 is similar to chamber 102 in FIG. 5 in most respects except for the substitution of multi-layered fiber mat 100' for fiber mat 100. Multi-layered fiber mat 100' is a filter composed of a number of individual adjacent layers. Each individual layer is impregnated with any of the reagents discussed above; and several individual layers, each layer with a different reagent, are combined into a single multi-layered fiber mat. The number of layers can range from one to N and fiber mat 100' can contain any combination of layers and reagents depending upon the desired functionality.

Although the invention has been described with reference to particular embodiments, the description is only an example of the invention's application and should not be taken as a limitation. In particular, even though much of preceding discussion was aimed at liquid acid-impregnated multilobal fibers 2, alternative embodiments of this invention include multilobal fibers 2 impregnated with solid acid reagents 12 and multilobal fibers 2 impregnated with a base, both in liquid and solid form to filter non-basic contaminants. Various other adaptations and combinations of features of the embodiments disclosed are within the scope of the invention as defined by the following claims.

We claim:

1. A filter comprising a fiber mat for the removal of base contaminants from a fluid stream, comprising:
    a plurality of elongated fibers, each fiber defining a plurality of longitudinally extending internal cavities, each cavity having an opening to an outer surface of said fiber;
    a reagent which is disposed within said internal cavitites of said elongated fibers and is chemically reactive with said base contaminants;
    wherein said reagent is retained within said internal cavities and is exposed to said fluid stream directed through said filter; and
    an adsorptive solid disposed within said internal cavities, said adsorptive solid impregnated with said reagent selected from the group consisting of an acid, a coordinating agent, a complexing agent, and a deliquescent agent.

2. The filter of claim 1, wherein said fibers have a plurality of capped lobes associated with said opening to said outer surface of said fiber.

3. The filter of claim 2, wherein said capped lobes are T-shaped.

4. The filter of claim 1, wherein there are three of said internal cavities.

5. The filter of claim 1, wherein said reagent is adapted to react with said base contaminants selected from the group consisting of ammonium and amines.

6. The filter of claim 1, wherein said adsorptive solid is selected from the group consisting of zeolite, aluminum oxide, activated carbon, and silica.

7. The filter of claim 1, wherein said acid is an inorganic acid selected from the group consisting of phoshopric, sulfuric, and boric acid.

8. The filter of claim 1, wherein said acid is a monocarboxylic, dicarboxylic, or tricarboxylic organic acid selected from the group consisting of citric, lactic, maleic, fumaric, caproic, lauric, oxalic, malonic, tartaric, succinic, salicylic and malic acid.

9. The filter of claim 1, wherein said reagent is a liquid.

10. The filter of claim 1, wherein said reagent is a solid.

11. A filter comprising multi-layered fiber mat for removal of base contaminants from a fluid stream, comprising:
    a plurality of adjacent fiber layers, each said layer comprising:
        a plurality of elongated fibers, each fiber defining a plurality of longitudinally extending internal cavities, each cavity having an opening to an outer surface of said fiber;
        a reagent which is disposed within said internal cavities of said elongated fibers and is chemically reactive with said base contaminants;
    wherein said reagent is retained within said internal cavities and is exposed to said fluid stream directed through said filter;
    wherein said reagent is adapted to react with said contaminants;
    wherein said reagent in each said layer is selected from the group consisting of an acid, a coordinating agent, a complexing agent, and a deliquescent agent; and
    wherein each said fiber layer contains a different reagent.

12. The filter of claim 11, wherein said fibers have a plurality of capped lobes associated with said opening to said outer surface of said fiber.

13. The filter of claim 12, wherein said capped lobes are T-shaped.

14. The filter of claim 11, wherein there are three of said internal cavities.

15. The filter of claim 11, wherein said reagent is adapted to react with said base contaminants selected from the group consisting of ammonium and amines.

16. The filter of claim 11, further comprising an adsorptive solid disposed within said internal cavities, said adsorptive solid selected from the group consisting of zeolite, aluminum oxide, activat carbon, and silica.

17. The filter of claim 16, wherein said adsorptive solid is impregnated with a reagent selected from the group consisting of an acid, a coordinating agent, a complexing agent, and a deliquescent agent.

18. The filter of claim 1, wherein said acid is an inorganic acid selected from the group consisting of phosphoric, sulfuric, and boric acid.

19. The filter of claim 11, wherein said acid is a monocarboxylic, dicarboxylic, or tricarboxylic organic acid selected from the group consisting of citric, lactic, maleic, fumaric, caproic, lauric, oxalic, malonic, tartaric, succinic, salicylic and malic acid.

20. The filter of claim 11, wherein said reagent is a liquid.

21. The filter of claim 11, wherein said reagent is a solid.

22. A filtering system for removal of base contaminants from an airstream, comprising:
    a housing, further comprising an inlet through which said airstream enters and an outlet through which said airstream exits;
    a filter disposed within said housing, further comprising:
        a plurality of elongated fibers each defining a plurality of longitudinally extending internal cavities, each said cavity having an opening to an outer surface of said fiber;
        a reagent disposed within said internal cavities of said elongated fibers such that said reagent is retained within said internal cavities and is exposed to said airstream such that said reagent chemically reacts with at least a portion of said base contaminants, wherein the reagent is selected from the group consisting of an acid, a coordinating agent, a complexing agent, and a deliquescent agent.

23. The filter of claim 22, wherein said acid is an inorganic acid selected from the group consisting of phosphoric, sulfuric, and boric acid.

24. The filter of claim 22, wherein said acid is a monocarboxylic, dicarboxylic, or tricarboxylic organic acid selected from the group consisting of citric, lactic, maleic, fumaric, caproic, lauric, oxalic, malonic, tartaric, succinic, salicylic and malic acid.

25. The filter of claim 22, wherein said reagent is a liquid.

26. The filter of claim 22, wherein said reagent is a solid.

27. The filter of claim 22, wherein said fibers have a plurality of capped lobes associated with said opening to said outer surface of said fiber.

28. The filter of claim 27, wherein said capped lobes are T-shaped.

29. The filter of claim 22, wherein there are three of said internal cavities.

30. The filter of claim 22, wherein said reagent is adapted to react with said base contaminants selected from the group consisting of ammonium and amines.

31. The filter of claim 22, further comprising an adsorptive solid disposed within said internal cavities, said adsorptive solid selected from the group consisting of zeolite, aluminum oxide, activated carbon, and silica.

32. The filter of claim 31, wherein the absorptive solid is impregnated with said reagent.

33. A filter comprising a fiber mat for removal of ammonium and amines from an airstream, said fiber mat comprising:

a plurality of elongated fibers, each said fiber defining a plurality of longitudinally extending internal cavities, each said cavity having an opening to an outer surface of said fiber;

an acid disposed within said internal cavities of said elongated fibers;

wherein said acid is retained within said internal cavities and is exposed to said airstream directed through said filter; and wherein said acid reacts with at least a portion of said ammonium and amines to form a salt retained within said internal cavities.

34. The filter of claim 33, wherein said fibers have a plurality of capped lobes associated with said opening to said outer surface of said fiber.

35. The filter of claim 33, wherein said capped lobes are T-shaped.

36. The filter of claim 33, wherein there are three of said internal cavities.

37. The filter of claim 33, wherein said acid is a liquid.

38. The filter of claim 33, wherein said acid is a solid.

39. The filter of claim 33, wherein said acid is an inorganic acid selected from the group consisting of phosphoric, sulfuric, and boric acid.

40. The filter of claim 33, wherein said acid is a monocarboxylic, dicarboxylic, or tricarboxylic organic acid selected from the group consisting of citric, lactic, maleic, fumaric, caproic, lauric, oxalic, malonic, tartaric, succinic, salicylic and malic acid.

41. A method of removing ammonium and amines from a fluid stream, comprising the acts of:

providing a filter, comprising:

a plurality of elongated fibers, each fiber defining a plurality of longitudinally extending internal cavities, each said cavity having an opening to an outer surface of said fiber; and, an acid disposed within said internal cavities of said elongated fibers such that said acid is retained within said internal cavities;

directing said fluid stream through said filter, whereby said acid in said filter reacts with at least a portion of said ammonium and amines to form a salt retained within said internal cavities in said fibers of said filter.

42. The method of claim 41, wherein said fibers have a plurality of capped lobes associated with said opening to said outer surface of said fiber.

43. The method of claim 42, wherein said capped lobes are T-shaped.

44. The method of claim 41, wherein there are three of said internal cavities.

45. The method of claim 41, wherein said acid is a liquid.

46. The method of claim 41, wherein said acid is a solid.

47. The method of claim 41, wherein said acid is an inorganic acid selected from the group consisting of phosphoric, sulfuric, and boric acid.

48. The method of claim 41, wherein said acid is a monocarboxylic, dicarboxylic, or tricarboxylic organic acid selected from the group consisting of citric, lactic, maleic, fumaric, caproic, lauric, oxalic, malonic, tartaric, succinic, salicylic and malic acid.

* * * * *

UNITED STATES PATENT AND TRADEMARK OFFICE
CERTIFICATE OF CORRECTION

PATENT NO.    : 6,296,821 B1
DATED         : October 2, 2001
INVENTOR(S)   : Neil Hendricks et al.

It is certified that error appears in the above-identified patent and that said Letters Patent is hereby corrected as shown below:

<u>Title page,</u>
Item [22], Filed replace "Oct. 12, 1999" with -- Oct. 20, 1999 --.

Signed and Sealed this

Sixteenth Day of July, 2002

Attest:

Attesting Officer

JAMES E. ROGAN
*Director of the United States Patent and Trademark Office*